United States Patent [19]

Byers et al.

[11] Patent Number: 5,515,507
[45] Date of Patent: May 7, 1996

[54] MULTIPLE WIDTH DATA BUS FOR A MICROSEQUENCER BUS CONTROLLER SYSTEM

[75] Inventors: Larry L. Byers, Apple Valley; Joseba M. De Subijana, Minneapolis; Wayne A. Michaelson, Circle Pines; Lloyd E. Thorsbakken, Minneapolis; Howard H. Tran, Woodbury, all of Minn.

[73] Assignee: Unisys Corporation, Blue Bell, Pa.

[21] Appl. No.: 173,317

[22] Filed: Dec. 23, 1993

[51] Int. Cl.[6] .................................................. G06F 11/34
[52] U.S. Cl. .................................. 395/185.09; 371/49.2
[58] Field of Search .......................... 395/575; 371/37.6, 371/37.4, 48, 49.1, 49.2, 49.3, 51.1, 53, 27, 15.1

[56] References Cited

U.S. PATENT DOCUMENTS

| | | | |
|---|---|---|---|
| 4,453,215 | 6/1984 | Reid | 364/200 |
| 4,486,826 | 12/1984 | Wolff et al. | 364/200 |
| 4,597,084 | 6/1986 | Dynnson et al. | 371/51 |
| 4,654,857 | 3/1987 | Sammon et al. | 371/68 |
| 4,663,729 | 5/1987 | Matick | 364/900 |
| 4,667,305 | 5/1987 | Dill | 364/900 |
| 4,750,177 | 6/1988 | Hendrie et al. | 371/32 |
| 5,113,369 | 5/1992 | Kinoshita | 395/325 |
| 5,255,376 | 10/1993 | Frank | 395/325 |

*Primary Examiner*—Robert W. Beausoliel, Jr.
*Assistant Examiner*—Phung My Chung
*Attorney, Agent, or Firm*—Steven P. Skabrat; Charles A. Johnson; Mark T. Starr

[57] ABSTRACT

A bus architecture and associated circuitry for providing communication between processors and multiple gate arrays whereby the size of the data being transferred may be either full words of 32-bits or 36-bits per word, or half words of 16-bits or 18-bits per word. Parity generation logic operates on the data to be sent over the bus to generate a parity value from the correct data bits depending on the selected data word size. Parity checking logic operates on the data received from the bus to check the parity of the correct data bits depending on the selected data word size.

34 Claims, 6 Drawing Sheets

MULTIPLE WIDTH DATA BUS FOR A MICROSEQUENCER BUS CONTROLLER SYSTEM

CROSS REFERENCES TO RELATED APPLICATIONS

This application is related to the concurrently filed applications listed below, the disclosures of which are incorporated herein by reference. All of the listed applications are assigned to the same assignee as the present invention.

Outboard File Cache System, Ser. No. 08/174,750, invented by Thomas Cooper and Robert E. Swenson.

Microsequencer Bus Controller System, Ser. No. 08/172,657, invented by Larry L. Byers, Joseba M. De Subijana, and Wayne A. Michaelson.

BACKGROUND OF THE INVENTION

1. Field of the Invention

This invention relates generally to communications within multi-processor computer systems. More specifically, it relates to a bus architecture for connecting multiple reduced instruction set computer (RISC) processors and special purpose Very Large Scale Integration (VLSI) gate arrays.

2. Background Information

Many computer systems today are composed of multiple processing units in order to increase their processing power. These programmable processors often must interact with hardwired logic such as VLSI gate arrays. Some functions of complex computer systems are performed by such hardware because of the increased speed capabilities this hardware provides. However, other functions may be better implemented in software or firmware because of the flexibility software or firmware provides. In a large computer system such as the Extended Processing Complex (XPC), a file cache system designed to operate in conjunction with a 2200 Series computer system, both of which are available from Unisys Corporation, some capabilities of embedded subsystems are implemented in a combination of hardware and software/firmware. These subsystems perform required functions as components of the larger system. These subsystems combine the increased speed of hardware implementations with the flexible nature of programming to efficiently satisfy subsystem requirements.

One of the requirements of these subsystems is to communicate with other systems and components that may have different word sizes for data transferred between systems. For example, the characteristic word size for instructions and data in the 2200 Series computer is 36-bits, but microprocessors in the XPC system operate on 32-bit words. Thus, a device such as the XPC that must communicate with a 2200 Series computer system and various 32-bit devices must be capable of processing data in either format. One way to satisfy this requirement is to duplicate the bus interface between the external systems, the 2200 Series computer, and the XPC. That is, separate interfaces for 32-bit data transfers and 36-bit data transfers could be provided. However, this approach would be more expensive because of the added hardware and may not be possible because of the additional signal lines required. What is desired and most advantageous is a common bus design that fully supports 36-bit or 32-bit data transfers without requiring duplicate signal lines or redundant input/output (I/O) logic.

Attempting to satisfy the requirement by simply adding four data lines to a 32-bit bus would not be sufficient. Since error detection is very important in large fault tolerant systems such as the XPC, the mere addition of four data lines when operating in a 36-bit mode would cause parity errors on data transfers because existing 32-bit parity generation and checking circuitry would not be able to correctly handle 36-bit data transfers. Uniform interface logic is necessary on both sending and receiving ends of the bus to provide effective parity generation and parity checking regardless of whether the bus is being used in 36-bit or 32-bit mode. Such an interface does not exist in the prior art.

There have been various attempts to provide a multiple or variable width data path. In Matick, et. al., U.S. Pat. No. 4,663,729, and Dill, et. al., U.S. Pat. No. 4,667,305, is disclosed a display architecture which supports data path widths of 32, 64, 128, and 256 bits. However, the disclosed system does not provide for extensive parity generation and checking as does the present invention, nor does it support 36-bit data words. A data bus being operable with 8-bit, 16-bit or 32-bit modes is shown in Kinoshita, U.S. Pat. No. 5,113,369. The data bus shown is used in a computer system capable of executing programs containing instructions and data consisting of 16-bit or 32-bit words. This system does not show the use of 32-bit and 36-bit data words or parity generation logic. A dual bit length protocol is described in Frank, U.S. Pat. No. 5,255,376, which is capable of transferring data in 32-bit or 64-bit words. The Frank system is designed to transfer data in one of two word sizes, but the size of one must be twice the size of the other (i.e., 32 and 64). In addition, no parity error detection logic is described. What the prior an is lacking is a bus with associated parity generation and parity checking logic which will transfer either 32-bit or 36-bit data words without using duplicate signal lines.

SUMMARY OF THE INVENTION

An object of this invention is to transfer data in one of two discrete word sizes on a common bi-directional bus interface.

A further object of this invention is to provide an improved bi-directional bus system capable of selectively transferring full words or half-words in one of two discrete sizes.

Another object of this invention is to transfer either full words consisting of 36-bits or 32-bits, or half words consisting of 18-bits or 16-bits over a common bi-directional bus.

Yet another object of this invention is to correctly generate parity values for data to be selectively sent over a hi-directional bus in either 36-bit word or 32-bit word capacities.

Still another object of this invention is to correctly check parity values for data received over a bi-directional bus in either 36-bit word or 32-bit word capacities.

Additional objects, advantages and novel features of the invention will be set forth in part in the description which follows, and in pan will become apparent to those skilled in the art upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by an improved bus architecture and associated circuitry that allows devices operating selectively on 32-bit data words or 36-bit data words to communicate with each other.

In accordance with an aspect of this invention, the system for transferring data between dual processors and multiple logic circuits comprises a bus for transferring data in full words of 32-bits or 36-bits per word, or half words of 16-bits or 18-bits per half word. Parity generation logic is included in devices communicating over the bus to generate a parity bit for each half-word of dam sent over the bus. In the preferred embodiment odd parity is used. The dam bits included in the parity generation are different depending on the current transfer mode. If the current transfer mode is selecting 36-bit data transfers, one parity bit is computed from bits zero through 17 of a data word, and a second parity bit is computed from bits 18 through 35 of the data word. If the current transfer mode is selecting 32-bit dam transfers, one parity bit is computed from bits of four through 19 of a data word, and a second parity bit is computed from bits 20 through 35 of the data word. In 32-bit transfer mode, bits zero through three of the dam word are discarded. Parity checking logic is also included to check the two parity bits for each data word received over the bus. Finally, lines for selecting the size of a dam word (either 32-bits or 36-bits) and for selecting full word or half-word data transfers is provided.

Still other objects and advantages of the present invention will become readily apparent to those skilled in the art from the following derailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

I. Microsequencer Bus Controller System Architecture

The Microsequencer Bus Controller System provides the capability of flexible, microprocessor-based control of multiple gate arrays on a circuit card within a larger computer system. In the preferred embodiment, it is a part of the Extended Processing Complex (XPC), a File Cache System. However, it may also be used in other computer systems where microprocessor control of multiple logic circuits is needed. In the preferred embodiment, these logic circuits are implemented as gate arrays, although other configurations of circuitry may be employed. The Microsequencer Bus Controller System is a flexible solution to the problem of controlling function-specific VLSI gate arrays or other circuitry on one circuit card because one or more gate arrays may be redesigned without any other changes to the Microsequencer Bus Controller System hardware being required. When a gate array or other circuitry is redesigned, a corresponding change to the software the microprocessors execute may easily be made.

Figure 1:
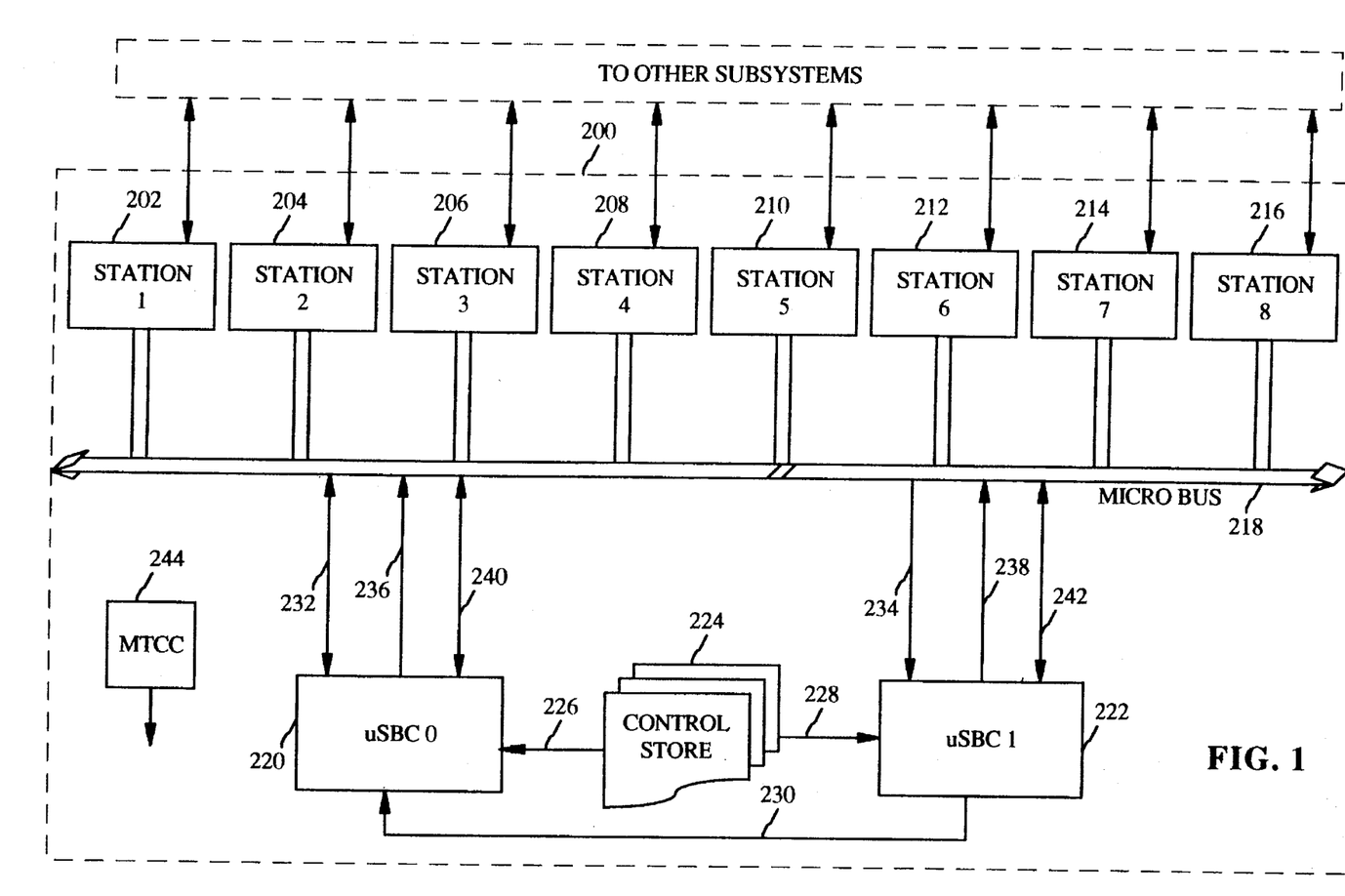
FIG. 1 is a block diagram of the Microsequencer Bus Controller System.

FIG. 1 is a block diagram of the Microsequencer Bus Controller System. The Microsequencer Bus Controller System 200 contains up to eight Stations 202, 204, 206, 208, 210, 212, 214, 216 connected to a bi-directional internal communication bus called the Micro Bus 218. In the preferred embodiment, a Station is a collection of logic implemented in a gate array on a VLSI part produced with Complementary Metal-Oxide Semiconductor (CMOS) 448 technology that performs system-specific functions. Alternatively, a Station could be implemented as a Programmable Logic Array (PLA) or other circuitry. A Station is coupled to the Micro Bus 218 and also may interface with another bus, I/O mechanism, or subsystem that is external to the Microsequencer Bus Controller System. That is, it may read data from or write data to other hardware components in the File Cache System. In the preferred embodiment, there are ten different gate array designs representing Stations in the File Cache System. These Stations perform functions such as database management, data reformatting, data transfer management operations, and fiber optic interface management. However, it is possible that any circuitry supporting a set of required functions can fulfill the role of a Station and be connected to the Micro Bus 218.

The Micro Sequencer Bus Controller (uSBC) 0 220 and uSBC 1 222 are special purpose RISC microprocessors that control the operation of the Stations via the Micro Bus 218. The uSBCs execute an instruction stream that is stored in the Control Store 224, a high speed static random access memory (SRAM). The instruction stream is written into the Control Store 224 at system initialization time. The instruction stream is fetched by uSBC 0 220 from the Control Store 224 over Line 226. The same instruction stream is fetched by uSBC 1 222 from the Control Store 224 over Line 228. The first microprocessor, uSBC 0 220, is the master, and the second microprocessor, uSBC 1 222, is the slave. The master and slave execute the same instructions at the same time but only the master microprocessor writes data on the Micro Bus 218. Results of operations performed by the slave microprocessor uSBC 1 222 are forwarded over Line 230 to the master microprocessor uSBC 0 220, where they are compared with the results of operations performed by the master microprocessor uSBC 0 to detect any possible errors. Errors are reported to the Maintenance/Clock Control (MTCC) gate array 244. The uSBCs connect to the Micro Bus 218 over three distinct sets of lines: Address Lines 232, 234, Data Lines 236, 238, and Control Lines 240, 242.

The Micro Bus 218 is a bi-directional, bit parallel bus used by the uSBCs to communicate with the Stations and for data transfer between Stations. It provides access from a uSBC to hardware registers and designators resident on a Station. The Maintenance Clock Control (MTCC) gate array 244 provides maintenance operations such as fault detection, clock distribution and control, and system reset/recovery for all components of the Microsequencer Bus Controller System 200. The MTCC drives a bus enable line (not shown), which allows the uSBCs 220, 222, and the Stations to drive data on the Micro Bus 218.

II. The Micro Bus

The Micro Bus 218 is a bi-directional bus which provides communication paths between the uSBCs and the Stations. The Micro Bus consists of Data and Data Parity lines 232 and 234, Address lines 236 and 238, and various Control lines 240 and 242. Data and Data Parity lines 232, Address lines 236, and Control lines 240, connect uSBC 0 220 to the Stations. Data and Data Parity lines 234, Address lines 238, and Control lines 242, connect uSBC 1 222 to the Stations. The address portion of the bus is capable of addressing up to eight Stations. The Stations and the uSBCs transmit and receive data between themselves across the Micro Bus. Each uSBC can independently put 11 bits of Address 236 or 238 onto the Micro Bus 218 to select a Station from which to read data or write data. The Micro Bus is adaptable for use as a 36-bit data bus, or a 32-bit data bus. The Micro Bus also handles half-words of each of these two modes, i.e., 18-bit mode and 16-bit mode. The mode of parity checking on the Micro Bus is different depending on whether the data bus is operating 36-bits or 32-bits, as will be described in further detail below.

Figure 2:
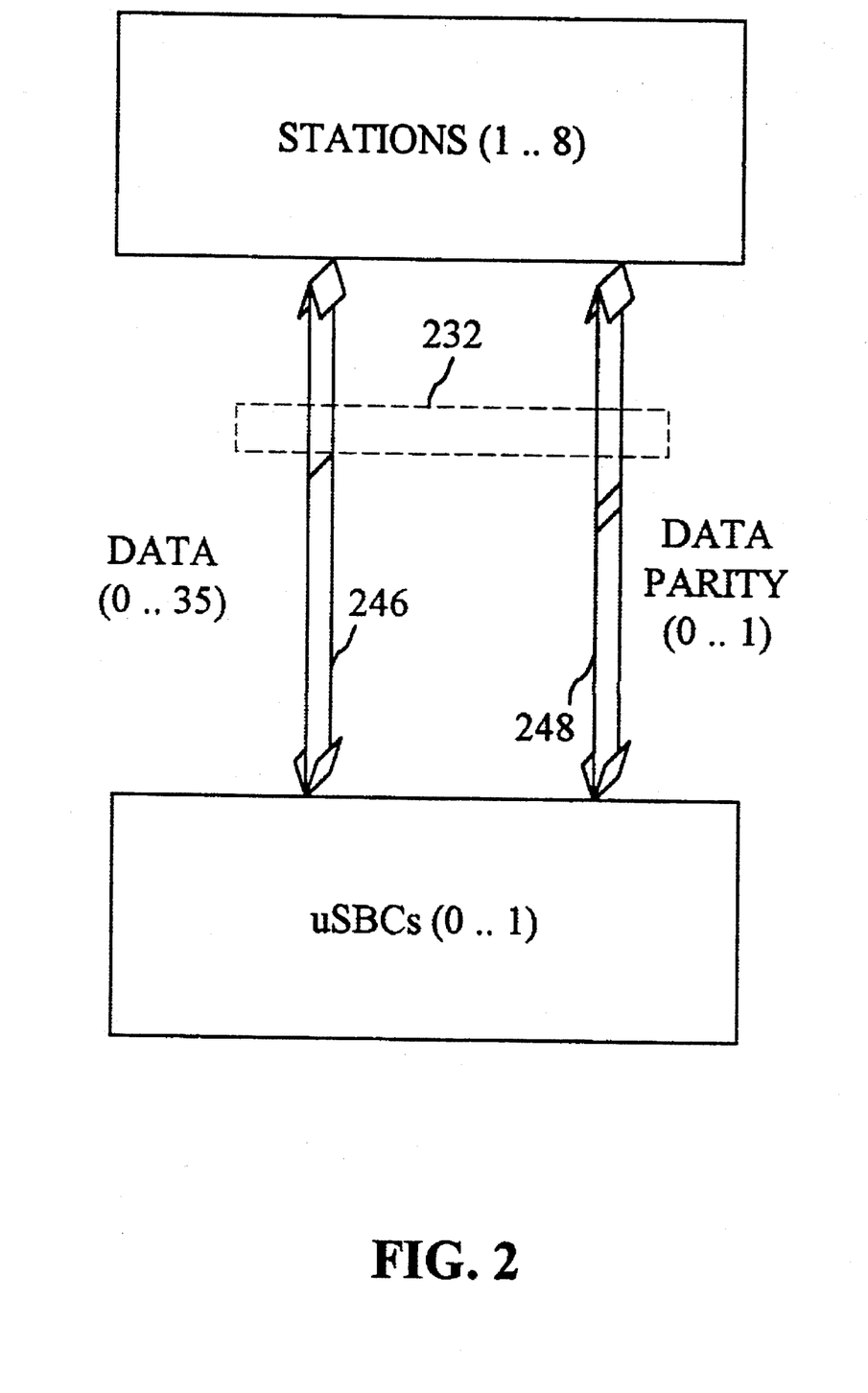
FIG. 2 is a block diagram illustrating the Data and Data Parity paths of the Micro Bus.
Figure 3:
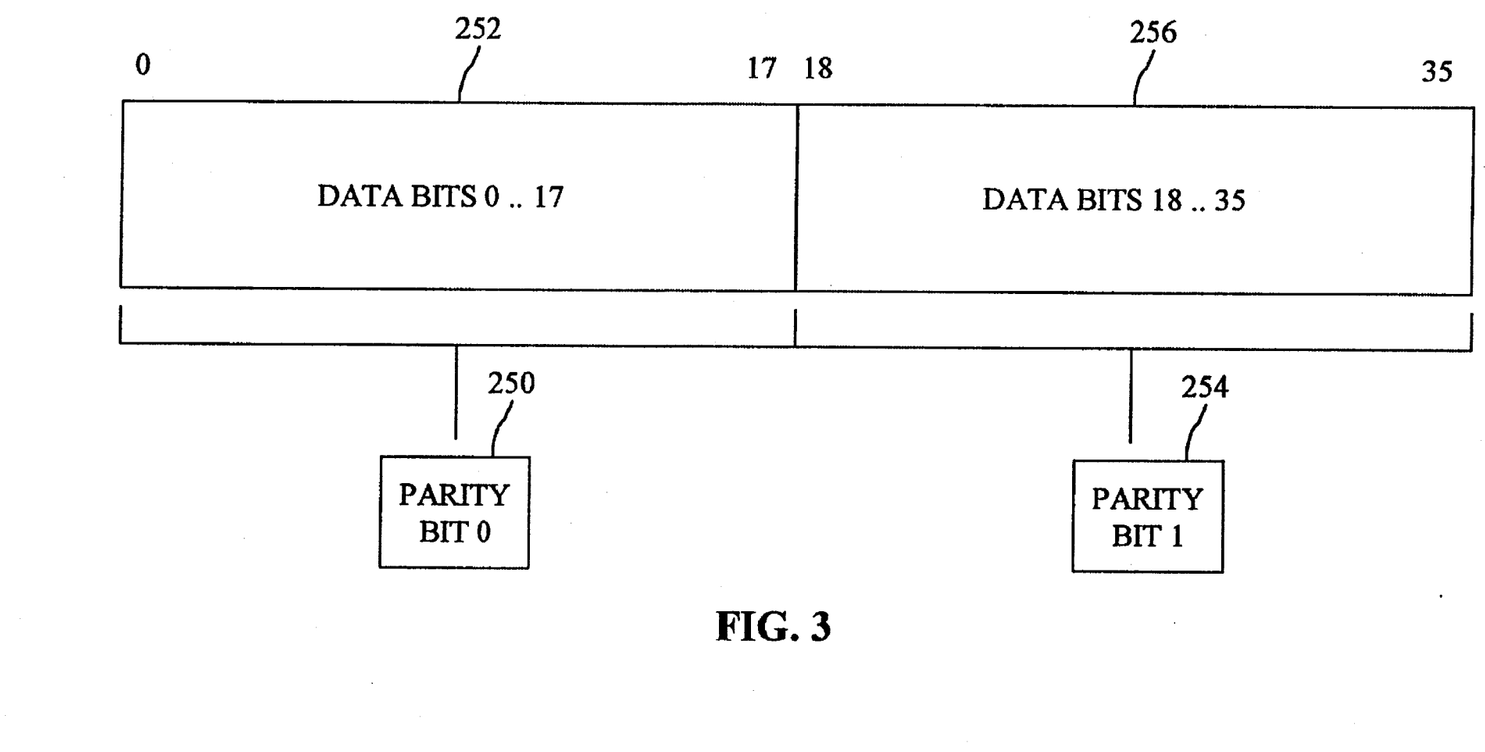
FIG. 3 shows the parity domain for the Data path of the Micro Bus when the Microsequencer Bus Controller System is operating in 36-bit mode.

FIG. 2 is a block diagram illustrating the Data and Data Parity paths of the Micro Bus. The Data and Data Parity path 232 consists of two components. The Data path 246 between the uSBCs 220, 222 and the Stations 202, 204, 206, 208, 210, 212, 214, 216, consists of 36-bits. The Data Parity path 248 consists of two bits. Data and Data Parity path 234 is identical in structure to Data and Data Parity Path 232. Data and Data Parity values can be sent from a uSBC to a Station, or from a Station to a uSBC. FIG. 3 shows the parity domain for the Data path of the Micro Bus 218 when the Microsequencer Bus Controller System 200 is operating in 36-bit mode. In this mode of operation, the full 36 bits are used for data transfer purposes, with Parity Bit 0 250 representing the odd parity computed from Data Bits zero through 17 252, and Parity Bit 1 254 representing the odd parity computed from Data bits 18–35 256. The uSBC is capable of reading 36-bit data from and writing 36-bit data to the Micro Bus 218. Bit zero shown in FIG. 3 is the most significant bit (MSB) and bit 35 is the least significant bit of the data word. The lower half-word is specified by bits zero through 17 and the upper half-word is specified by bits 18 through 35.

Figure 4:
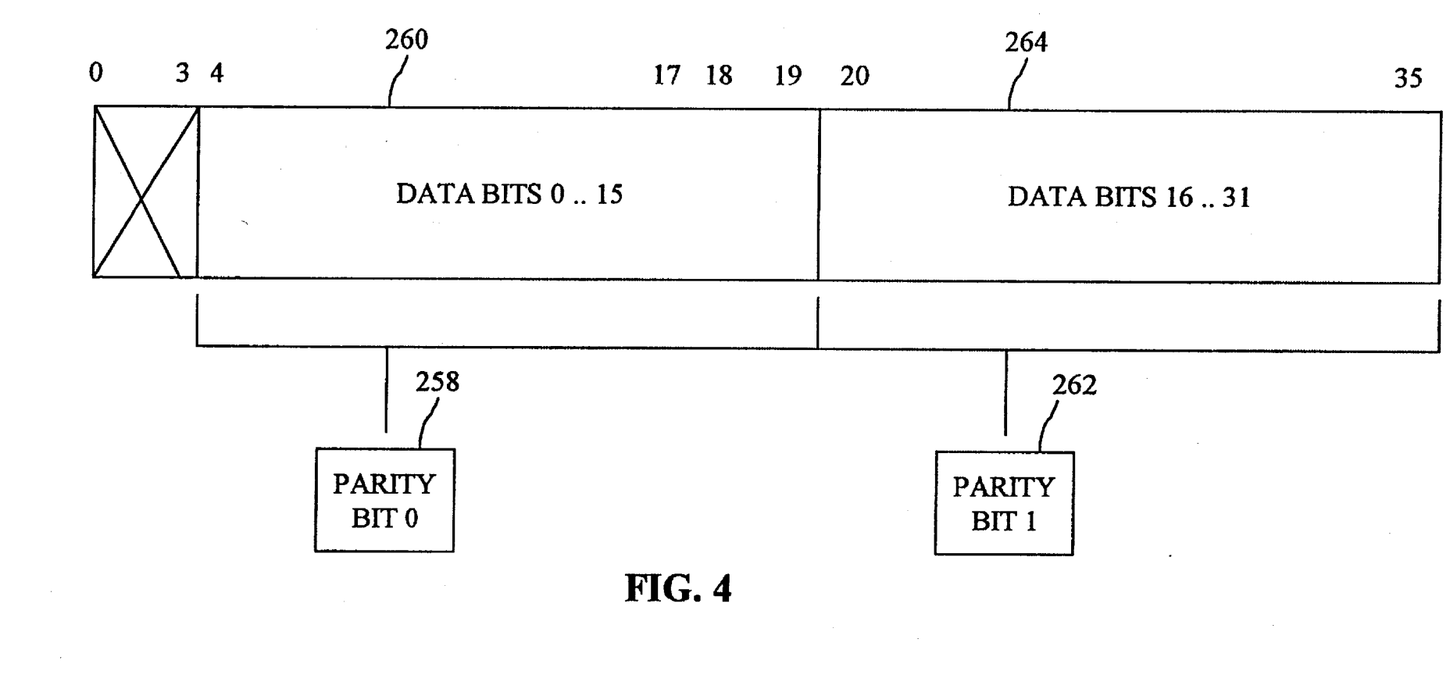
FIG. 4 shows the parity domain for the Data path of the Micro Bus when the Microsequencer Bus Controller System is operating in 32-bit mode.

FIG. 4 shows the parity domain for the Data path of the Micro Bus 218 when the Microsequencer Bus Controller System 200 is operating in 32-bit mode. Only 32 bits of the 36 bits available are now used for data transfer purposes, with Parity Bit 0 258 representing the odd parity computer from original Data bits four through 19 260, and Parity Bit 1 262 representing the odd parity computed from Data bits 20 through 35 264. Bits zero through 3 of the data word are disregarded. Thus, a 36-bit transfer is mapped onto a 32-bit representation. In this manner, the uSBC is capable of reading 32-bit data from and writing 32-bit data to the Micro Bus 218. Bit four shown in FIG. 4 is the most significant bit (MSB) and bit 35 is the least significant bit of the data word. The lower half-word is specified by bits four through 19 and the upper half-word is specified by bits 20 through 35.

III. Multiple Width Data Bus Usage

Data may be received over the Micro Bus 218 in either 36-bit or 32-bit modes. The uSBC has a mode selection line (not shown) as one of its connections. In the preferred embodiment, this mode selection line is manually set by an external switch on the uSBC or Station. Alternatively, the mode selection line could be dynamically changeable. If the mode selection line is set, the uSBC is configured for 32-bit processing. If the mode selection line is clear, the uSBC is configured for 36-bit processing. Additionally, the uSBC can read from and write data to the Micro Bus 218 in either full-word or half-word modes. In full-word mode, the data selectively consists of either 32 or 36 bits, depending on the mode selection line status. In half-word mode, the data consists of either 16 to 18 bits; again, depending on the mode selection line status. If the half-word mode is selected, when data is received over the Micro Bus from a Station, the uSBC uses only the upper half-word of the data. Similarly, when data is to be written to a Station over the Micro Bus, only the upper half-word is used. The lower half-word is zeroed out. By utilizing the mode selection line and control logic as shown below, a single hardware design for a processor is used in subsystems which must process different sizes of data.

In the Microsequencer Bus Controller System, early error detection is very important. However, providing the capability for a selective multiple width data bus causes a problem with parity checking schemes for the data bus. Therefore, special logic has been designed to ensure that the hardware design of the uSBC remains uniform despite different data widths being selectively utilized on the same data lines.

Figure 5:
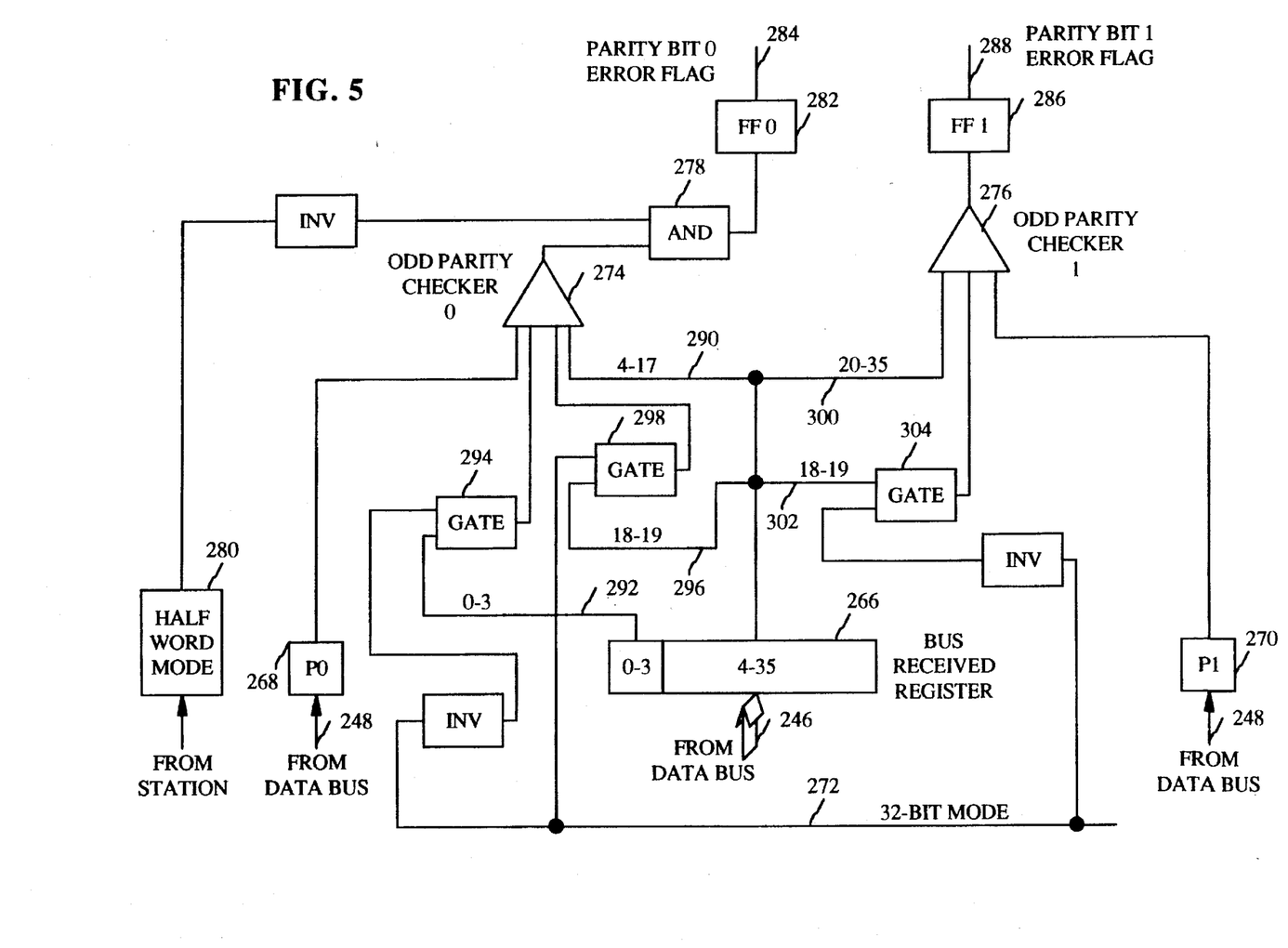
FIG. 5 is a diagram of the parity checking logic for data input from the Micro Bus.

FIG. 5 is a diagram of the parity checking logic for data input from the Micro Bus. Recall from FIG. 2 that the uSBC receives data from Data lines 246 and parity values from Data Parity lines 248. The Data is stored in the Bus Received Register 266. Data Parity Bit 0, read from Data Parity lines 248, is stored in Flip-Flop P0 268 and Data Parity Bit 1, also read from Data Parity lines 248, is stored in Flip-Flop P1 270. The externally set mode selection line is represented in FIG. 5 as 32-Bit Mode line 272. The default status of the mode selection line is to select 36-bit mode. When it the mode selection line is active, the 32-bit mode of operation is selected.

The main components of the parity checking logic are Odd Parity Checker 0 274 and Odd Parity Checker 1 276, which are responsible for checking the parity for Data Parity Bit 0 and Data Parity Bit 1, respectively. Although odd parity is used in the preferred embodiment, even parity could also be used. The implementation of Odd Parity Checkers is well known in the art. Odd Parity Checker 274 0 checks the parity for each lower half-word of data. Odd Parity Checker 1 276 checks the parity for each upper half-word of data. The results of Parity Checker 0 are forwarded to AND gate 278. Also input to AND 278 is the negation of a Half-Word Mode indicator, previously received from a Station and stored in Half-Word Mode Flip-Flop 280. Thus, if Odd Parity Checker 0 274 detects a parity error on the current data transfer and the current operating mode is full word mode, then Flip Flop 0 (FF 0) 282 is loaded with a high value, signifying that a parity error has been detected on the lower half-word of the data transfer. Parity Bit 0 Error Flag 284 carries this value to other logic on the uSBC or Station (not shown) for further error recovery processing. If Odd Parity Checker 0 274 does not detect an error or the operating mode is half-word, then Parity Bit 0 Error Flag 284 does not indicate an error. When the operating mode is half-word, Data Parity Bit 0, representing the parity of the lower half-word of the data transfer, is not considered for error detection purposes.

If Odd Parity Checker 1 276 detects a parity error, then Hip Flop 1 (FF 1) 286 is loaded with a high value, signifying that a parity error has been detected for the upper half-word of the data transfer. Parity Bit 1 Error Flag 288 carries this value to other logic on the uSBC or Station for further error recovery processing. The output of Odd Parity Checker 1 276 is always considered for error detection purposes, regardless of whether the current mode is full word or half-word.

Inputs to the parity checkers are as follows. First, to check Data Parity Bit 0 (stored in Flip-Flop P0 268), Odd Parity Checker 0 274 needs the lower half-word of the data received. Regardless of whether the uSBC is in 32-bit mode or 36-bit mode, bits four through 17 of the data word are always input to Odd Parity Checker 0 274. These bits of data are transferred from the Bus Received Register 266 on Line 290. If 36-bit operating mode is selected, bits zero through three of the data word must be included in the parity check for the lower half-word. Therefore, bits zero through three, carried by Line 292 from the Bus Received Register 266, and the negation of the 32-Bit Mode line 272 are inputs to Gate 294. Gate 294 consists of multiple AND gates, each taking as input a bit line and the 32-Bit Mode control line 272. The Gate 294 operates to pass or block bit line values depending on the status of the 32-Bit Mode line. The other Gates in this Figure are similarly composed. The resulting output is forwarded to Odd Parity Checker 0 274. The use of the Gate 294 ensures that bits zero through four will not be considered for parity checking purposes if the mode is 32-bit mode. Thus, if 32-bit operating mode is selected, bits zero through three are blocked from being included in the parity determination. Instead, bits 18 through 19 are to be included in the lower half-word. Thus, bits 18–19, carried by line 296, and the 32-Bit Mode line 272 are input to Gate 298. The resulting output is forwarded to Odd Parity Checker 0 274. This logic combination ensures that Odd Parity Checker 0 274 uses bits zero through 17 of the data word when 36-bit operating mode is selected, and bits four through 19 of the data word when 32-bit operating mode is selected. The Odd Parity Checker 0 274 then compares the value P0 268 with the parity value it generated due to the outputs from Gates 294 and 298, and Line 290.

Inputs to Odd Parity Checker 1 276 are as follows. To check Data Parity Bit 1 (stored in Flip-Flop P1 270), Odd Parity Checker 1 276 needs the upper half-word of the data received. Regardless of whether the uSBC is in 32-bit mode or 36-bit mode, bits 20 through 35 of the dam word are always input to Odd Parity Checker 1 276. These bits of data are transferred on Line 300. If 36-bit operating mode is selected, bits 18 through 19 of the upper half-word of the data must be included in Odd Parity Checker 1 276. Thus, bits 18 through 19, carried by Line 302, and the negation of the 32-Bit Mode line 272 are input to Gate 304. The resulting output is forwarded to Odd Parity Checker 1 276. If 36-bit mode is selected, bits 18 through 19 are considered in the parity determination for the upper half-word by Odd Parity Checker 1 along with bits 20 through 35. If 32-bit mode is selected, bits 18 through 19 are not considered by Odd Parity Checker 1 in checking the parity of the upper half-word of data. The Odd Parity Checker 1 276 then compares the value P1 270 with the parity value it generated due to the outputs from Gate 304 and Line 300.

Figure 6:
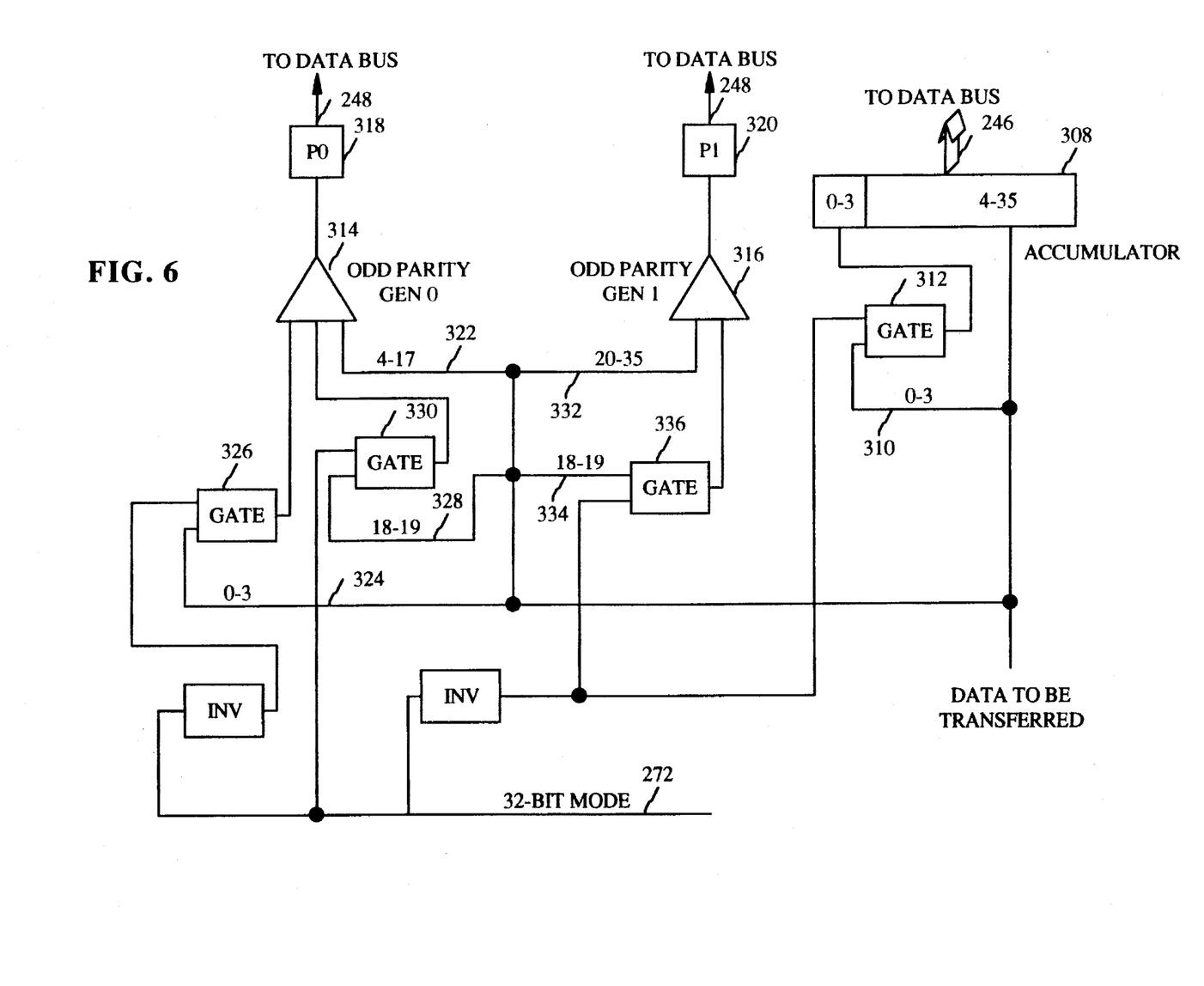
FIG. 6 is a diagram of the parity generation logic for data output to the Micro Bus.

FIG. 6 is a diagram of the parity generating logic for data output to the Micro Bus. Recall from FIG. 2 that the uSBC outputs data on Data lines 246 and parity values on Data Parity lines 248. Data to be sent on the Micro Bus 218 originates in various sections of the uSBC or a Station's logic (not shown) and is selected by Multiplexor (MUX) 306. Data is transferred to the parity generating logic via Lines 307. Line 309 controls the selection of data to be output over the Micro Bus 218. It is set by control logic resident in the uSBC or Station (not shown). This data is stored in the Accumulator register 308 before transmission on the Micro Bus. The Accumulator 308 contains 36 bits of data. If 36-bit mode is selected, all 36 bits of data are to be transferred. Bits zero through three of a data word, carried on Line 310, are input along with the negation of the 32-Bit Mode line 272 to Gate 312. Gate 312 and the other Gates in this Figure are composed of multiple logical AND gates, each taking a bit line and a control line as input. If 32-bit mode is selected, bits zero through three are blocked and do not carry forward into the Accumulator 308. If 36-bit mode is selected, bits zero through three pass through and are loaded into the Accumulator 308.

Parity values are generated for the data sent on the Micro Bus by Odd Parity Generation logic 0 (Odd Parity Gen 0) 314 and Odd Parity Gen 1 316. Odd Parity Gen 0 314 generates Data Parity Bit 0 from the lower half-word of the dam word to be transferred. Odd Parity Gen 1 316 generates Data Parity Bit 1 from the upper half-word of the data word to be transferred. Odd Parity Gen 0 314 stores Data Parity Bit 0 into Parity Flip-Flop P0 318 for subsequent transmission. Similarly, Odd Parity Gen 1 316 stores Data Parity Bit 1 into Parity Flip-Flop P1 320 for subsequent transmission.

Inputs to the parity generation logic sections are as follows. First, to generate Data Parity Bit 0 in P0 318, Odd Parity Gen 0 314 needs the lower half-word of the data to be sent. Regardless of whether the uSBC is in 32-bit mode or 36-bit mode, bits four through 17 of the data word are always input to Odd Parity Gen 0 314. These bits are transferred on Line 322. If 36-bit mode is selected, bits zero through three of the data word must be included in the parity value computation for the lower half-word. Therefore, bits zero through three, carried by Line 324, and the negation of the 32-Bit Mode line 272 are inputs to Gate 326. The resulting output is forwarded to Odd Parity Gen 0 314. If 32-bit mode is selected, bits zero through three are blocked from being included in the parity generation. Instead, bits 18 through 19 are to be included in the lower half-word. Thus, bits 18 through 19, carried by Line 328, and the 32-Bit Mode line 272 are input to Gate 330. The resulting output is forwarded to Odd Parity Gen 0 314. This logic combination ensures that Odd Parity Gen 0 314 computes the odd parity from bits zero through 17 of the data word when 36-bit operating mode is selected, and from bits four through 19 of the data word when 32-bit operating mode is selected.

Inputs to Odd Parity Gen 1 316 are as follows. To generate Data Parity Bit 1 into Flip-Flop P1 320, Odd Parity Gen 1 316 needs the upper half-word of the data to be sent. Regardless of whether the uSBC is in 32-bit mode or 36-bit mode, bits 20 through 35 of the data word are always input to Odd Parity Gen 1 316. These bits are transferred on Line 332. If 36-bit operating mode is selected, bits 18 through 19 of the upper half word of the data must be included in Odd Parity Gen 1 316. To accomplish this, bits 18 through 19, carried by line 334, and the negation of the 32-Bit Mode line 272 are input to Gate 336. The resulting output is forwarded to Odd Parity Gen 1 316. If 36-bit mode is selected, bits 18 through 19 are considered in the upper half word parity generation by Odd Parity Gen 1 316. If 32-bit mode is selected, bits 18 through 19 are blocked and are not considered by Odd Parity Gen 1 316.

A bus architecture and related parity generation and parity checking logic have been disclosed. By changing parity domains depending on which operating mode is selected, a single set of data lines may be used by a processor to communicate with other devices and systems in full word or half-word format, wherein full word format may consist of either of 36-bits per word or 32-bits per word.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A system for generating and checking parity during transfer, in one of a plurality of data transfer word sizes, of data word signals between a data processor and a selected one of a plurality of logic circuits, said system comprising:

(a) data word size selection means, included in the data processor and the plurality of logic circuits, for selecting one of a plurality of data transfer word sizes for data word signals to be transferred;

(b) bus means, coupled to the data processor, the plurality of logic circuits, and said data word size selection means for selectively transferring data word signals and a first set of data word parity signals between the data processor and the plurality of logic circuits, said bus means transferring said data word signals in groupings of said selected data transfer word size;

(c) parity generation means, included in the data processor and the plurality of logic circuits and coupled to said bus means and said data word size selection means, for generating said first set of data word parity signals for said selected data word signals to be sent by said bus means; and (d) parity checking means, included in the data processor and the plurality of logic circuits and coupled to said bus means and said data word size selection means, for generating a second set of data word parity signals from said selected data word signals received from said bus means, for comparing said first set of data word parity signals received from said bus means with said second set of data word parity signals generated by said parity checking means, and for indicating a parity error if said first set of data word parity signals and said second set of data word parity signals exhibit a selected error condition.

2. The system of claim 1, wherein said plurality of data word transfer sizes includes full words of 36 bits, full words of 32 bits, half-words of 18 bits, and half-words of 16 bits per data transfer.

3. The system of claim 2, wherein each of said sets of data parity word signals comprises two bits, one of said two bits representing a parity signal of a first selected data word grouping of said selected data word signals, the other of said two bits representing a parity signal of a second selected data word grouping of said selected data word signals.

4. The system of claim 3, wherein said first selected data word grouping of said selected data word signals include bits zero through 17 when said data word size selection means selects said data word transfer size of full words of 36 bits.

5. The system of claim 3, wherein said first selected data word grouping of said selected data word signals includes bits 4 through 9 when said data word size selection means selects said data word transfer size of full words of 32 bits.

6. The system of claim 3, wherein said second selected data word grouping of said selected data word signals includes bits 18 through 35 when said data word size selection means selects said data word transfer size of full words of 36 bits.

7. The system of claim 3, wherein said second selected data word grouping of said selected data word signals includes bits 20 through 35 when said data word size selection means selects said data word transfer size of full words of 32 bits.

8. The system of claim 3, wherein said parity signal of said first selected data word grouping of said selected data word signals and said parity signal of said second selected data word grouping of said selected data word signals are odd parity.

9. The system of claim 3, wherein said parity generation means comprises:

(a) data selection means for selecting ones of said data word signals to be sent by said bus means;

(b) output data storage means, coupled to said bus means and said data word selection means, for storing said selected ones of said data word signals and said data word parity signals for subsequent transmission to said bus means;

(c) first parity generating means, coupled to said output data storage means and said data selection means, for generating said parity signal of said first selected data word grouping of said selected data word signals and for storing said parity signal of said first selected data word grouping in said output data storage means; and (d) second parity generating means, coupled to said output data storage means and said data selecting means, for generating said parity signal of said second selected data word grouping of said selected data word signals and for storing said parity signal of said second selected data word grouping in said output data storage means.

10. The system of claim 3, wherein said parity checking means comprises:

(a) input data storage means, coupled to said bus means, for storing said selected data word signals and said data parity word signals received from said bus means;

(b) first parity checking means, coupled to said input data storage means, for checking said parity signal of said first selected data word grouping of said selected data word signals and for generating a first data word grouping parity error indication;

(c) mode indicating means, coupled to said first parity checking means, for indicating whether parity errors in said first selected data word grouping of said selected data word signals should be reported;

(d) second parity checking means, coupled to said input data storage means, for checking said parity signal of said second selected data word grouping of said selected data word signals and for generating a second data word grouping parity error indication;

(e) first storage means, coupled to said first parity checking means, for storing said first data word grouping parity error indication; and (f) second storage means, coupled to said second parity checking means, for storing said second data word grouping parity error indication.

11. The system of claim 1, wherein said bus means includes means for transferring data word signals and data word parity signals in two directions.

12. A system for generating and checking parity during transfer, in one of a plurality of data word transfer sizes, of data word signals between a data processor and a selected one of a plurality of logic circuits, said system comprising:

(a) a data word size selection line, included in the data processor and the plurality of logic circuits for providing a selection signal indicative of a selected one of a plurality of data word transfer sizes for data word signals to be transferred, said selected data word transfer size modulo any other of the plurality of data word transfer sizes being non-zero;

(b) a bus coupled to the data processor, the plurality of logic circuits, and said data word size selection line, said bus selectively transferring data word signals in groupings of said selected data word transfer size;

(c) parity generation circuitry, included in the data processor and the plurality of logic circuits and coupled to said bus and said data word size selection line, for generating a first set of data word parity signals for said selected data word signals to be sent by said bus; and (d) parity checking circuitry, included in the data processor and the plurality of logic circuits and coupled to said bus and said data word size selection line, for generating a second set of data word parity signals from said selected data word signals received from said bus, comparing said first set of data word parity signals received from said bus with said second set of data word parity signals generated by said parity checking circuitry, and indicating a parity error if said first set of data word parity signals and said second set of data word parity signals exhibit a selected error condition.

13. The system of claim 12, wherein said plurality of data word transfer sizes further includes full words of 36 bits, full words of 32 bits, half-words of 18 bits, and half-words of 16 bits per data transfer.

14. The system of claim 12, wherein each of said sets of data word parity signals comprises two bits, one of said two bits representing a parity signal of a first selected half-word of said selected data word signals, the other of said two bits representing a parity signal of a second selected haft-word of said selected data word signals.

15. The system of claim 14, wherein said first selected half-word of said selected data word signals include bits zero through 17 when said data word size selection line indicates said data word transfer size of full words of 36 bits.

16. The system of claim 14, wherein said first selected half-word of said selected data word signals includes bits 4 through 19 when said data word size selection line indicates said data transfer size of full words of 32 bits.

17. The system of claim 14, wherein said second selected haft-word of said selected data word signals includes bits 18 through 35 when said data word size selection line indicates said data word transfer size of full words of 36 bits.

18. The system of claim 14, wherein said second selected half-word of said selected data word signals includes bits 20 through 35 when said data word size selection line indicates said data word transfer size of full words of 32 bits.

19. The system of claim 14, wherein said parity signal of said first selected half-word of said selected data word signals and said parity signal of said second selected half-word are odd parities.

20. The system of claim 14, wherein said parity generation circuitry comprises:

(a) data selection circuitry for selecting ones of said data word signals to be sent by said bus;

(b) an output data register, coupled to said bus and said data selection circuitry, for storing said selected ones of said data word signals for subsequent transmission to said bus;

(c) a first output data parity line;

(d) a second output data parity line;

(e) first parity generation circuitry, coupled to said output data register, said bus, said data word size selection line, and said first output data parity line, for generating said parity signal of said first selected half-word of said selected data word signals and forwarding said parity signal of said first selected half-word on said first output data parity line; and (f) second parity generation circuitry, coupled to said output data register, said bus, said data word size selection line, and said second output data parity line, for generating said parity signal of said second selected half-word of said selected data word signals and forwarding said parity signal of said secured selected half-word on said second output data parity line.

21. A system as in claim 14, wherein said parity checking circuitry comprises:

(a) an input data register, coupled to said bus, for storing said selected data word signals received from said bus;

(b) a first input data parity line, coupled to said bus, for communicating said parity signal of said first selected half-word, (c) a second input data parity line, coupled to said bus, for communicating said parity signal of said second selected half-word, (d) first parity checking circuitry, coupled to said input data register and said first input data parity line, for checking said parity signal of said first selected half-word of said selected data word signals and generating a first half-word parity error indication;

(e) a half-word mode indication line, coupled to said first parity checking circuitry, for indicating whether parity errors in said first selected half-word of said selected data word signals should be reported;

(f) second parity checking circuitry, coupled to said input data register and said second input data parity line, for checking said parity signal of said second selected half-word of said selected data word signals and generating a second half-word parity error indication;

(g) a first output parity error flip-flop, coupled to said first parity checking circuitry, for storing said first half-word parity error indication; and (h) a second output parity error flip-flop, coupled to said second parity checking circuitry, for storing said second half-word parity error indication.

22. The system of claim 11, wherein said bus is bi-directional.

23. A system for generating and checking parity during transfer of data word signals between processing units, said system comprising:

(a) data word size selection means included in the processing units for selecting one of two data word transfer sizes, said data word transfer sizes including words having a first number of bits per data transfer and words having a second number of bits per data transfer, said first number of bits modulo said second number of bits being non-zero;

(b) bus means coupled to the processing units and said data word size selection means for selectively transferring data word signals and a first set of data word parity signals between the processing units, said bus means transferring said data word signals in groupings of said selected data word transfer size;

(c) parity generation means, included in the processing units and coupled to said bus means and said data word size selection means, for generating said first set of data word parity signals for said selected data word signals to be sent by said bus means; and (d) parity checking means, included in the processing units and coupled to said bus means and said data word size selection means, for generating a second set of data word parity signals from said selected data word signals received from said bus means, for comparing said first set of data word parity signals received from said bus means with said second set of data word parity signals generated by said parity checking means, and for indicating a parity error if said first set of data word parity signals and said second set of data word parity signals exhibit a selected error condition.

24. The system of claim 23, wherein each of said sets of data word parity signals comprises two bits, one of said two bits representing a parity signal of a first selected half-word of said selected data word signals, the other of said two bits representing a parity signal of a second selected half-word of said selected data word signals.

25. The system of claim 24, wherein said first number of bits per data transfer is 36 and said second number of bits per data transfer is 32.

26. The system of claim 25, wherein said first selected half-word of said selected data word signals includes a first set of bits and said second selected half-word of said selected data word signals includes a second set of bits when said data word size selection means selects said first number of bits per data transfer.

27. The system of claim 26, wherein said first set of bits includes bits zero through 17 of said selected data word signals and said second set of bits includes bits 18 through 35 of said selected data word signals.

28. The system of claim 24, wherein said parity generation means comprises:

(a) data selection means for selecting ones of said data word signals to be sent by said bus means;

(b) output data storage means, coupled to said bus means and said data selection means, for storing said selected ones of said data word signals and said data word parity signals for subsequent transmission to said bus means;

(c) first parity generating means, coupled to said output data storage means and said data selection means, for generating said parity signal of said first selected half-word of said selected data word signals and storing said parity signal of said first selected half-word in said output data storage means; and (d) second parity generating means, coupled to said output data storage means and said data selecting means, for generating said parity signal of said second selected haft-word of said selected data word signals and storing said parity signal of said second selected half-word in said output data storage means.

29. The system of claim 24, wherein said parity checking means comprises:

(a) input data storage means, coupled to said bus means, for storing said selected data word signals and said data word parity signals received from said bus means;

(b) first parity checking means, coupled to said input data storage means, for checking said parity signal of said first selected haft-word of said selected data word signals and generating a first half-word parity error indication;

(c) half-word mode indicating means, coupled to said first parity checking means, for indicating whether parity errors in said first selected haft-word of said selected data word signals should be reported;

(d) second parity checking means, coupled to said input data storage means, for checking said parity signal of said second selected half-word of said selected data word signals and generating a second half-word parity error indication;

(e) first storage means, coupled to said first parity checking means, for storing said first half-word parity error indication; and (f) second storage means, coupled to said second parity checking means, for storing said second half-word parity error indication.

30. The system of claim 25, wherein said first selected half-word of said selected data word signals includes a third set of bits and said second selected haft-word of said selected data word signals includes a fourth set of bits when said data word size selection means selects said second number of bits per data transfer.

31. The system of claim 30, wherein said third set of bits includes bits 4 through 19 of said selected data word signals and said fourth set of bits includes bits 20 through 35 of said selected data word signals.

32. A system for generating and checking parity during transfer, in either first or second data word transfer sizes, of data word signals between a data processor and a selected one of a plurality of logic circuits, the first data word transfer size modulo the second data word transfer size being non-zero, said system comprising:

(a) a data word size selection line, included in the data processor and the plurality of logic circuits for providing a selection signal indicative of a selected one of the first and second data word transfer sizes for data word signals to be transferred;

(b) a bi-directional bus coupled to the data processor, the plurality of logic circuits, and said data word size selection line, said bi-directional bus selectively transferring data word signals between the data processor and the plurality of logic circuits in groupings of said selected data word transfer size;

(c) parity generation circuitry, included in the data processor and the plurality of logic circuits and coupled to said bi-directional bus and said data word size selection line, to generate a first set of data word parity signals for said selected data word signals to be sent by said bi-directional bus, said first set of data word parity signals including two bits, one of said two bits representing a parity signal of a first selected half-word of said selected data word signals, the other of said two bits representing a parity signal of a second selected half-word of said selected data word signals, said parity generation circuitry including (c1) data selection circuitry coupled to said data word size selection line to select ones of said data word signals for which parity signals are generated;

(c2) an output data register, coupled to said bi-directional bus and said data selection circuitry, to store said selected ones of said data word signals for subsequent transmission to said bi-directional bus;

(c3) a first output data parity line coupled to said bi-directional bus to send said parity signal of said first selected half-word of said selected data word signals;

(c4) a second output data parity line coupled to said bi-directional bus to send said parity signal of said second selected half-word of said selected data word signals;

(c5) first and second output data parity flip-flops, said first output data parity flip-flop coupled to said first output data parity line, said second output data parry flip-flop coupled to said second output data parity line;
(c6) first parity generation circuitry, coupled to said data selection circuitry and said first output data parity flip-flop, to generate said parity signal of said first selected half-word of said selected data word signals and to store said parity signal of said first selected half-word into said first output data parity flip-flop for subsequent transmission over said first output data line; and
(c7) second parity generation circuitry, coupled to said data selection circuitry and said second output data parity flip-flop, to generate said parity signal of said second selected half-word of said selected data word signals and to store said parity signal of said second selected half-word into said second output data parity flip-flop for subsequent transmission over said second output data line; and
(d) parity checking circuitry, included in the data processor and the plurality of logic circuits and coupled to said bi-directional bus and said data word size selection line, to generate a second set of data word parity signals from said selected data word signals received from said bi-directional bus, to compare said first set of data word parity signals received from said bi-directional bus with said second set of data word parity signals generated by said parity checking circuitry, and to indicate a parity error if said first set of data word parity signals and said second set of data word parity signals are different, said parity checking circuitry including
(d1) an input data register, coupled to said bi-directional bus, to store said selected word data signals received from said bi-directional bus;
(d2) a first input data parity line, coupled to said bi-directional bus, to receive said parity signal of said first selected half-word of said selected data word signals;
(d3) a second input data parity line, coupled to said bi-directional bus, to receive said parity signal of said second selected half-word of said selected data word signals;
(d4) first parity checking circuitry, coupled to said input data register and said first input data parity line, to check said parity signal of said first selected half-word of said selected data word signals and generate a first half-word parity error indication;
(d5) a half word mode indication line, coupled to said first parity checking circuitry, to indicate whether parity errors in said first selected half-word of said selected data word signals should be reported;
(d6) a first output parity error flip-flop, coupled to said first parity checking circuitry, to store said first half-word parity error indication if said half-word mode indication line indicates parity errors in said first selected half-word of said selected data word signals should be reported;
(d7) second parity checking circuitry, coupled to said input data register and said second input data parity line, to check said parity signal of said second selected half-word of said selected data word signals and generate a second half-word parity error indication; and
(d8) a second output parity error flip-flop, coupled to said second parity checking circuitry, to store said second half-word parity error indication.

33. In a computer system having a bus connecting multiple processing units, the bus having a selectable data word transfer size, a method for generating and checking parity on data word signals transferred by the bus comprising the steps of:
(a) selecting a data word transfer size having a first number of bits per data word transfer or a second number of bits per data word transfer, said first number of bits modulo said second number of bits being non-zero;
(b) selecting data word signals to be transferred by the bus;
(c) generating a first parity signal from a first set of bits of said selected data word signals when said selected data word transfer size is said first number of bits per data word transfer;
(d) generating said first parity signal from a second set of bits of said selected data word signals when said selected data word transfer size is said second number of bits per data word transfer;
(e) generating a second parity signal frown a third set of bits of said selected data word signals when said selected data word transfer size is said first number of bits per data word transfer;
(f) generating said second parity signal from a fourth set of bits of said selected data word signals when said selected data word transfer size is said second number of bits per data word transfer;
(g) transferring said selected data word signals, said first parity signal, and said second parity signal over the bus;
(h) checking said first parity signal received from the bus with a parity signal generated from said first set of bits of said selected data word signals when said selected data word transfer size is said first number of bits per data word transfer and generating a first error indication if said first parity signal and said parity signal generated from said first set of bits are different;
(i) checking said first parity signal received from the bus with a parity signal generated from said second set of bits of said selected data word signals when said selected data word transfer size is said second number of bits per data word transfer and generating said first error indication if said first parity signal and said parity signal generated from said second set of bits are different;
(j) checking said second parity signal received from the bus with a parity signal generated from said third set of bits of said selected data word signals when said selected data word transfer size is said first number of bits and generating a second error indication if said second parity signal and said parity signal generated from said third set of bits are different; and
(k) checking said second parry signal received from the bus with a parry signal generated from said fourth set of bits of said selected data word signals when said selected data word transfer size is said second number of bits and generating said second error indication if said second parity signal and said parity signal generated from said fourth set of bits are different.

34. In a computer system having a bus connecting multiple processing units, the bus having a selectable data word transfer size of words having 36 bits or words having 32 bits, a method for generating and checking parity on data word signals transferred by the bus, said method comprising the steps of:
(a) selecting a data word transfer size of 36 bits per data word transfer or 32 bits per data word transfer;

(b) selecting data word signals to be transferred by the bus;

(c) generating a first parity signal from bits zero through 17 of said selected data word signals when said selected data word transfer size is 36 bits;

(d) generating said first parity signal from bits 4 through 19 of said selected data word signals when said selected data word transfer size is 32 bits;

(e) generating a second parity signal from bits 18 through 35 of said selected data word signals when said selected data word transfer size is 36 bits;

(f) generating said second parity signal from bits 20 through 35 of said selected data word signals when said selected data word transfer size is 32 bits;

(g) transferring said selected data word signals, said first parity signal, and said second parity signal over the bus;

(h) checking said first parity signal received from the bus with a parity signal generated from bits zero through 17 of said selected data word signals when said selected data word transfer size is 36 bits and generating a first error indication if said first parity signal and said parity signal generated from bits zero through 17 are different;

(i) checking said first parity signal received from the bus with a parity signal generated from bits 4 through 19 of said selected data word signals when said selected data word transfer size is 32 bits and generating said first error indication if said first parity signal and said parity signal generated from bits 4 through 19 are different;

(j) checking said second parity signal received from the bus with a parity signal generated from bits 18 through 35 of said selected data word signals when said selected data word transfer size is 36 bits and generating a second error indication if said second parity signal anti said parity signal generated from bits 18 through 35 are different; and (k) checking said second parity signal received from the bus with a parity signal generated from bits 20 through 35 of said selected data word signals when said selected data word transfer size is 32 bits and generating said second error indication if said second parry signal and said parity signal generated from bits 20 through 35 are different.

\* \* \* \* \*